United States Patent Office 2,902,045
Patented Sept. 1, 1959

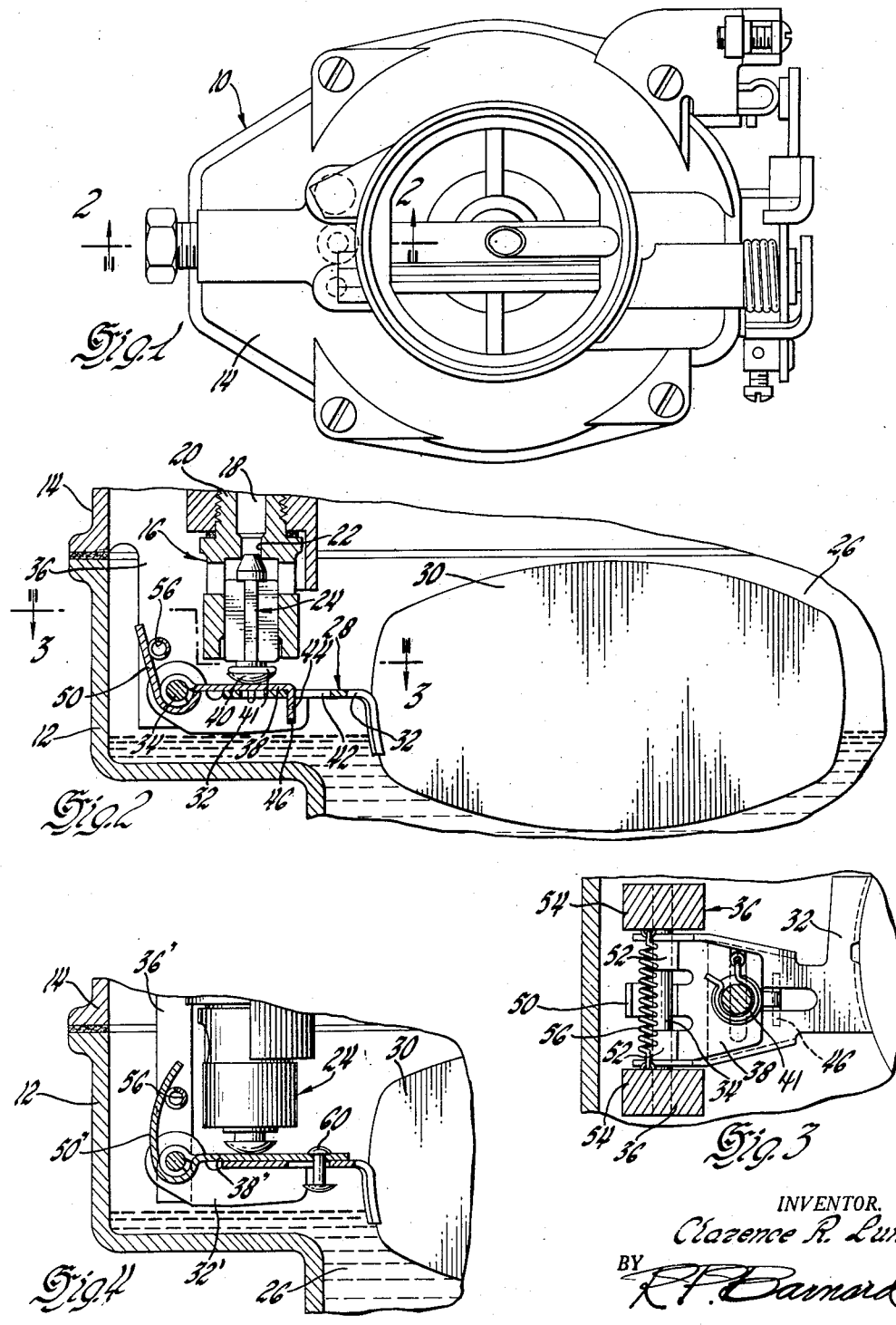

2,902,045
CARBURETOR FLOAT MECHANISM

Clarence R. Lunn, Lathrup Village, Mich., assignor to General Motors Corporation, Detroit, Mich., a corporation of Delaware Application April 12, 1957, Serial No. 652,447

1 Claim. (Cl. 137—400)

The present device relates to an improved carburetor float mechanism in which extraneous movements or vibrations of the float mechanism are not transmitted to the fuel inlet valve to upset the normal feed of fuel to the carburetor fuel reservoir.

The present device is an improvement over copending application Serial No. 434,901, Olson, filed June 7, 1954, now matured into Patent Number 2,804,087. In this latter device a multi-part float bowl lever mechanism is utilized to absorb undesirable float vibrations. In such a device coincidentally pivoted levers are utilized, one of which directly coacts wtih the fuel inlet valve and the other of which is fastened to the float mechanism and between which levers a spring device is interposed to absorb vibrations.

In present day carburetor construction it is increasingly necessary to decrease the depth of the float bowl casing in order to reduce the carburetor height by way of lowering the hool profile. In this process the decreased fuel depth in the float bowl provides less buoyant force for the float mechanisms and the latter must control fuel feed through a very limited range of vertical movement which has rendered these mechanisms very sensitive to shifting of the fuel within the casing due to acceleration and cornering conditions. In order to overcome this problem it has been the practice to utilize spring devices for increasing the buoyancy or buoyant effect of the floats to stabilize the actuation of the fuel inlet valve.

In the present device such a float buoyancy increasing spring has been uniquely combined with a multi-part float controlled lever system to isolate the fuel inlet valve from undesirable float vibrations.

The subject float control mechanism, in addition to increasing the buoyant effect of the float mechanism, permits a limited amount of lost motion between the float and the fuel inlet valve. In the present device the control of the fuel inlet valve is still accurately controlled in accordance with the fuel level in the float chamber but said control is achieved without the transmission of indiscriminant float vibrations particularly occasioned by the vehicle passing over unsmooth surfaces. The present device also tends to prevent chattering of the float valve on its seat and a consequent fuel build-up beyond the desired level.

A detailed description of the subject invention as well as other objects and advantages thereof will be apparent from a perusal of the detailed description which follows.

In the drawings:

Figure 1 is a plan view of a carburetor embodying the subject invention;

Figure 2 is a view along line 2—2 of Figure 1 showing an enlarged fragmentary view of the carburetor float control mechanism embodying the subject invention;

Figure 3 is a view along line 3—3 of Figure 2; and

Figure 4 is a modified form of the present invention.

A carburetor is shown generally at 10 and includes a float bowl casing 12 and a cover casing 14. A fuel inlet valve is indicated generally at 16 and is supported from cover casing 14 so as to project downwardly within the float casing 12. The inlet valve mechanism includes a fuel inlet passage 18 formed in casing 20 and which casing includes a seat 22 with which a slidable valve member 24 cooperates to control the flow of fuel into the float bowl reservoir 26. The vertical position of the valve member 24 is controlled by a float mechanism 28 adapted to move in accordance with the level of the fuel within reservoir 26.

Float mechanism 28 includes a float member 30 to which is fixed a first lever 32 pivotally supported on a trunnion 34 mounted on a bracket 36 depending from the cover casing 14. A second lever 38 is coincidentally with lever 32 mounted on trunnion 34 and is disposed between a head member 40 formed on the slidable valve member 24 and the lever 32. Lever 32 has an opening 42 formed therein and through which opening a depending portion 44 of the lever 38 is adapted to project. As better seen in Figure 3, the depending portion 44 of the lever 38 terminates in a T-shaped portion 46 which is vertically spaced from the main body of the lever to permit a limited amount of relative movement between the levers 32 and 38.

As best seen in Figures 2 and 3, one end of a wire clip member 41 surrounds the shank of valve head 40. The other end of clip member 41 is adapted to coact with lever 38 whereby downward movement of the lever will insure opening of valve 24.

A tang portion 50 is formed on lever 38 intermediate the bifurcated lever supporting portions 52.

A spring 56 is mounted between depending leg portions 54 of bracket 36 and is generally parallel with the axis of trunnion 34. Tang 50 is positioned with respect to spring 56 such that as the float member 30 moves downwardly in accordance with a depression or displacement of the fuel level in reservoir 26 the tang engages the spring. Spring 56 progressively resists the downward or fuel inlet valve opening movement of the float mechanism 28. It is apparent that the effect of spring 56 in so acting on tang 50 is to increase the buoyant effect of the float 30 and thereby stabilize the action of the float mechanism.

The levers 32 and 38 as well as spring 56 and tang 50 are so arranged that under normal operating conditions the levers will be slightly separated. In this way high frequency-low amplitude vibrations of the float mechanism may occur without the same being transmitted to the fuel inlet valve member 24. The amplitude of the vibrations which may thus be isolated from the fuel inlet valve is determined by the vertical spacing of the T-portion 46 of the lever 38 from the horizontal portion of the lever. While the exact amount of this spacing will vary with the particular installation, it has been found satisfactory in the illustrated embodiment to space such member to permit 3/32 of an inch travel between the levers 32 and 38 when T-portion 46 engages lever 32. This amount of spacing has been found adequate to preclude transmission of the most troublesome vibrations to the fuel inlet valve member 24 and at the same time not interfere with the normal functioning of the inlet valve in accordance with changes in the fuel level occasioned by fuel consumption.

The spring member 56 will thus be in constant engagement with the tang 50 tending to urge the valve member 24 in a closing direction with a force which is proportional to the drop of the float member 30 from the fuel cut-off level as represented in Figure 2. It is apparent that a limited decrease in the fuel level in reservoir 26 is possible before the lever 32 engages the T-shaped portion 46 of lever 38 to move the lever downwardly against the force of spring 56 to open the fuel inlet valve.

A modification of the present invention is shown in Figure 4 in which a double headed rivet 60 is substituted for the depending portion 46 of lever 38. In this case the rivet may either be loosely mounted or fixed to the lever 38' in the position shown in Figure 4 to again permit limited lost motion between the levers 32' and 38' in either direction.

I claim:

A carburetor comprising a casing, a fuel reservoir formed in said casing, a cover for the reservoir, a valve for controlling the admission of fuel to said reservoir, a float member responsive to the liquid level in said reservoir, a bifurcated bracket supported from the cover and depending within the reservoir, a trunnion supported by said depending bracket, a float member supporting lever rigidly secured to said float member and pivotally mounted on said trunnion, said supporting lever having an elongated aperture therein, a valve actuating lever also pivotally mounted on said trunnion and comprising a rigid downwardly extending member at the end remote from said trunnion, said downwardly extending member being received within said supporting lever aperture and having laterally extending portions to engage the edges of said aperture when moved a predetermined distance, a spring member mounted on said bracket in generally parallel relation with said trunnion, and a tang formed on said valve actuating lever to engage said spring and continuously urge said valve toward closed position.

References Cited in the file of this patent

UNITED STATES PATENTS

| | | |
|---|---|---|
| 1,891,249 | Summers | Dec. 20, 1932 |
| 2,064,156 | Firth | Dec. 15, 1936 |
| 2,503,036 | Fricke et al. | Apr. 4, 1950 |
| 2,804,087 | Olson | Aug. 27, 1957 |

FOREIGN PATENTS

| | | |
|---|---|---|
| 725,247 | Great Britain | Mar. 2, 1955 |